(12) United States Patent
Holzapfel et al.

(10) Patent No.: US 7,701,593 B2
(45) Date of Patent: Apr. 20, 2010

(54) OPTICAL POSITION MEASURING ARRANGEMENT

(75) Inventors: Wolfgang Holzapfel, Obing (DE); Walter Huber, Traunstein (DE); Erwin Spanner, Traunstein (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 96 days.

(21) Appl. No.: 12/151,587

(22) Filed: May 7, 2008

(65) Prior Publication Data
US 2008/0297809 A1    Dec. 4, 2008

(30) Foreign Application Priority Data
May 24, 2007    (DE)    ............ 10 2007 024 349

(51) Int. Cl.
*G01B 11/14*    (2006.01)
(52) U.S. Cl. .................................... 356/618
(58) Field of Classification Search ............... None
See application file for complete search history.

(56) References Cited

U.S. PATENT DOCUMENTS 4,776,701 A    10/1988   Pettigrew
6,906,315 B2    6/2005   Tobiason
6,970,255 B1 *  11/2005  Spady et al. ............. 356/616
7,495,774 B2 *   2/2009  Hays et al. .............. 356/519

FOREIGN PATENT DOCUMENTS

EP    0 163 362 B1    6/1988

OTHER PUBLICATIONS

R. M. Pettigrew, "Analysis of Grating Imaging and Its Application to Displacement Metrology," SPIE, vol. 136, 1st European Congress on Optics Applied to Metrology (1977), pp. 325-332.

* cited by examiner

*Primary Examiner*—Tu T Nguyen
(74) *Attorney, Agent, or Firm*—Brinks Hofer Gilson & Lione (57) ABSTRACT

An optical position measuring arrangement including a source of illumination that generates one or several bundles of illuminating beams, a measuring graduation that is illuminated by the source of illumination so as to generate a periodic fringe pattern of a defined fringe pattern period and a fiber-optical scanning head, wherein the fiber-optical scanning head scans the periodic fringe pattern. A scanning plate is arranged in the fiber-optical scanning head, wherein the scanning plate is matched to the fringe pattern period and scans the periodic fringe pattern. Fringe patterns, which are phase-shifted in relation to each other, are generated within a fringe pattern period in bundles of partial signal beams in the one or several bundles of illuminating beams via a wavelength-dependent local separation, and the bundles of partial signal beams are employed for conversion into position-dependent phase-shifted scanning signals.

21 Claims, 8 Drawing Sheets

OPTICAL POSITION MEASURING ARRANGEMENT

RELATED APPLICATIONS

Applicants claim, under 35 U.S.C. §119, the benefit of priority of the filing date of May 24, 2007 of a German patent application, copy attached, Serial Number 10 2007 024 349.0, filed on the aforementioned date, the entire contents of which is incorporated herein by reference.

BACKGROUND

1. Technical Field

The present invention relates to an optical position measuring arrangement for determining the relative position of a fiber-optical scanning head and of a measuring graduation which can be moved with respect to it in at least one measuring direction.

2. Background Information

Customarily, known optical position measuring arrangements include a measuring graduation, as well as a scanning unit, which can be moved in relation to it. As a rule, a light source, optoelectronic detector elements, as well as further optical components, such as lenses, gratings, etc. are arranged in the scanning unit. However, in certain cases of application a scanning unit having all these components can possibly be of too large a size. Furthermore, in connection with certain applications the result can be undesired effects on the active components of such a scanning unit by electromagnetic interference fields or increased temperatures. Moreover, a thermal effect on the measuring accuracy can occur because of the dissipation of electrical power, in particular that of the light source.

Therefore solutions for optical position measuring arrangements have become known, in which only the scanned measuring graduation, as well as a passive fiber-optical scanning head which can be moved in relation to it, are arranged at the actual measurement location. The remaining active components relative to the functioning of the scanning process, such as the light source, optoelectronic detector elements, etc. are arranged spatially distant from the measurement location and are connected with the fiber-optical scanning head by fiber-optical waveguides. It is possible in this way to realize a system of an extremely compact size at the actual measurement location. It is furthermore also possible to minimize interference effects on the various active components on the scanning site.

Such a position measuring arrangement is known from U.S. Pat. No. 6,906,315, for example, the entire contents of which are incorporated herein by reference. The position measuring arrangement disclosed in this publication includes, besides a measuring graduation embodied as a linear reflection measuring graduation, a fiber-optical scanning head, which can be displaced relative to it in at least one measuring direction. An electronic follow-up device is arranged, spatially distanced, downstream of the fiber-optical scanning head and is connected with it by means of suitable fiber-optical waveguides. Here, the electronic follow-up device includes, inter alia, the light source required for optical scanning, several optoelectronic detector elements, as well as further active components for signal generation and further signal processing, as required. The fiber-optical scanning head substantially includes the ends of several fiber-optical waveguides for supplying illumination, as well as for returning the signal-generating light beam bundles. At their ends on the measuring graduation side, the fiber-optical waveguides used for returning the light beam bundles are provided with suitable scanning gratings and are used for generating position-dependent, phase-shifted quadrature signals, i.e. for example four quadrature signals, each phase-shifted by 90°. In a known manner, the scanning gratings with different signal phases have suitable geometric offset distances between each other for this purpose.

With this solution it is considered to be disadvantageous that no so-called single field scanning of the measuring graduation is possible by it. This is understood to be scanning in which all phase-shifted signal portions are generated out of the same field of the scanned measuring graduation. It is a special advantage of this type of scanning that it is relatively insensitive to dirt on the measuring graduation and, in case of possible dirt accumulation, basically all phase-shifted signal portions are evenly affected. It is possible by this to minimize errors in the course of further signal processing, i.e. during a subsequent signal interpolation, for example.

OBJECTS AND SUMMARY OF THE INVENTION

An object of the present invention is based on creating an optical position measuring arrangement with a passive fiber-optical scanning head, by which single field scanning can be assured in the course of generating phase-shifted scanning signals.

In accordance with the present invention, this object is attained by an optical position measuring arrangement for determining the relative position of a fiber-optical scanning head and of a measuring graduation, which can be moved with respect to the fiber-optical scanning head in at least one measuring direction. The optical position measuring arrangement including a source of illumination that generates one or several bundles of illuminating beams, a measuring graduation that is illuminated by the source of illumination so as to generate a periodic fringe pattern of a defined fringe pattern period and a fiber-optical scanning head, wherein the measuring graduation moves relative to the fiber-optical scanning head and wherein the fiber-optical scanning head scans the periodic fringe pattern. A scanning plate is arranged in the fiber-optical scanning head in front of an end of a fiber-optical waveguide positioned at a side of the measuring graduation, wherein the scanning plate is matched to the fringe pattern period and scans the periodic fringe pattern when the fiber-optical scanning head scans the periodic fringe pattern. Fringe patterns, which are phase-shifted in relation to each other, are generated within a fringe pattern period in bundles of partial signal beams in the one or several bundles of illuminating beams via a wavelength-dependent local separation, and the bundles of partial signal beams are employed for conversion into position-dependent phase-shifted scanning signals.

It has now been provided in accordance with the present invention to assure the desired scanning properties by a suitable design of the scanning grating in front of the fiber-optical waveguide end at the measuring graduation.

The optical position measuring arrangement in accordance with the present invention includes a fiber-optical scanning head and a measuring graduation which can be moved in at least one measuring direction. The fiber-optical scanning head scans a periodic fringe pattern having a defined fringe pattern period and resulting from the illumination of the measuring graduation. A scanning plate, which is matched to the fringe pattern period, is arranged in front of the end on the measuring graduation-side of a fiber-optical waveguide. By one or more bundles of illuminating light beams it is possible by a wavelength-dependent local separation to create in bundles of partial signal beams fringe patterns within a fringe pattern period, which are phase-shifted with respect to each other. The bundles of partial signal beams can be used for conversion into position-dependent phase-shifted scanning signals.

The steps taken in accordance with the present invention now assure the desired single field scanning and the advantages connected therewith in regard to insensitivity to dirt in such a position measuring arrangement.

A compact way of construction now possible, along with a high mechanical resonance frequency, as well as the thermal passivity and insensitivity of the scanning operation to electromagnetic interference effects, could be mentioned as further advantages.

The suitable design of the scanning plate in the fiber-optical scanning head, which provides the phase-shifted bundles of partial signal beams required for single field scanning, can be of importance for the present invention. In this case, coding of the individual bundles of partial signal beams takes place as a function of the wavelength over different wavelength ranges of one spectrally broadband light source, or several individual light sources of different wavelengths. Various designs of the scanning plate are possible for the conversion of such coding of the signal phases of different wavelengths.

Based on the basic considerations in regard to the present invention, multiple embodiment variations of the position measuring arrangement in accordance with the present invention therefore result. The most diverse steps can of course also be employed in combination with each other.

It is thus possible, for example, to design the fiber-optical waveguide as a multi-mode fiber, through which it is possible to transmit the bundles of illuminating light beams required for illumination toward the measuring graduation, as well as the bundles of partial signal beams used for detection away from the measuring graduation.

It is possible in this case to arrange a spectrally broadband light source, or several light sources, which emit radiation of different wavelengths, at the end of the fiber-optical waveguide facing away from the measuring graduation, whose radiation can be respectively coupled by a coupling into the fiber-optical waveguide in the form of bundles of illuminating light beams.

It is furthermore possible to place a detector arrangement in the end of the fiber-optical waveguide facing away from the measuring graduation, which contains a splitter for separating the bundles of partial signal beams as a function of wavelength, as well as several optoelectronic detector elements, to which the split bundles of partial signal beams can be fed and which convert the detected bundle of partial signal beams into electrical, phase-shifted scanning signals.

In a possible first embodiment, the scanning plate can be designed as a stepped-phase grating on a transparent support substrate, which has several steps within a grating period, so that, together with the substrate back or a reflecting layer, several partial etalons per grating period, having different transmission wavelengths, are formed in this way, which are matched to the different wavelengths of the at least one bundle of illuminating light beams.

In this embodiment it is advantageous to select the spectral full-width-at-half-maximums (FWHMs) and the spectral spacing of the transmission lines of the formed partial etalons to be less than the spectral full-width-at-half-maximum of the emission line of the at least one light source.

It is furthermore advantageous if the spectral full-width-at-half-maximum of each of the transmission lines of the partial etalons is less than their spectral spacing.

The transmission lines of the partial etalons are preferably located symmetrically within the spectral full-width-at-half-maximum of the emission line of the at least one light source.

It has furthermore been shown to be advantageous to select the thickness of the partial etalons to be less than the coherence length of the at least one light source.

In a possible variation, the free spectral range between the transmission lines of the formed partial etalons is selected to be greater than the spectral full-width-at-half-maximum of the emission line of the at least one light source.

The scanning plate in this embodiment preferably includes a transparent support substrate, to the entire surface of which a first planar reflecting layer has been applied, on which the stepped phase grating structure made of a highly transparent dielectric device has been arranged and to which a further second reflecting layer has been applied in turn.

In a possible embodiment of this variation, the splitting means for the wavelength-dependent separation of the bundles of partial signal beams are embodied as a dispersive optical element on the part of the detector arrangement; the detector arrangement furthermore includes a lens for focusing the bundles of partial signal beams, wherein the detector elements, whose widths are matched to the spectral widths of the partial etalons, are arranged in the focal plane of the lens.

In a possible second embodiment, the scanning plate is constituted by a wedge-shaped plate, segmented in sections, with a sawtooth-shaped surface structure on a transparent support structure, which generates a Fizeau interference fringe pattern of equal thickness, wherein the wedge angle of the plate has been selected to be such that the resultant fringe distance of the Fizeau interference fringe pattern corresponds to that generated by the measuring graduation.

By such a design of the scanning plate it is possible within one fringe pattern period to generate several wavelength-coded Fizeau interference fringe patterns of the same thickness in the wedge-shaped plate, segmented in sections, with a sawtooth-shaped surface structure.

Preferably the mean thicknesses of the individual wedges are selected to be smaller than the respective coherence length of the at least one light source.

In an advantageous embodiment, the difference between the Fizeau interference fringe patterns of different wavelength, added up over the interference fringes within a sawtooth-shaped section, is maximally one quarter of the fringe pattern period generated by the measuring graduation.

The scanning plate of this embodiment advantageously includes a transparent support substrate, to the entire surface of which a first planar reflecting layer has been applied, on which the wedge-shaped plate, segmented in sections, with a sawtooth-shaped surface structure made of a highly transparent dielectric device, has been arranged and to which a further, second reflecting layer has been applied in turn.

In a possible third embodiment, the scanning plate is embodied in the form of several strip-shaped partial areas with different spectral transmission characteristics, which are matched to the wavelength of the at least one bundle of illuminating beams.

Here, the different partial areas are preferably embodied as transparent colored plastic layers, which can be photo-structured.

Further details and advantages of the present invention will be explained by the following description of exemplary embodiments of the position measuring arrangement in accordance with the present invention in connection with the drawing figures.

DETAILED DESCRIPTION OF THE PREFERRED EMBODIMENTS

The basic structure of the position measuring arrangement in accordance with the present invention will be explained in what follows by the schematic representation in FIG. 1.

The optical position measuring arrangement of the represented exemplary embodiment includes a linear measuring graduation 10, which is arranged movable in the measuring direction x relative to a fiber-optical scanning head 20. In this case it is possible that either the measuring graduation 10 is stationary and the fiber-optical scanning head 20 is movable, or that the measuring graduation 10 is movable and the fiber-optical scanning head 20 is stationarily arranged. The measuring graduation 10 and the fiber-optical scanning head 20 are connected with two objects, not represented, which are movable in the measuring direction x with respect to each other and whose relative position to each other is to be determined. These can perhaps be two components of a machine which are movable with respect to each other and whose relative position must be determined in order to perform an appropriate location or position regulation regarding these components.

The measuring graduation 10 of the represented exemplary embodiment is embodied in the form of a linear measuring graduation, which is scanned by the fiber-optical scanning head 20 by incident light. In this case the measuring graduation includes in a known manner of a reflection phase grating or a reflection amplitude grating, arranged on a suitable support substrate, which includes partial areas with different optical effects, arranged periodically in the measuring direction x.

Alternately to the represented embodiment it is of course also possible to employ a rotary measuring graduation in the form of a radial or drum grating in connection with the position measuring arrangement in accordance with the present invention.

The fiber-optical scanning head 20 provided at the measurement location includes a scanning plate 21 arranged in front of the measuring graduation side of a fiber-optical waveguide 22. For generating the displacement-dependent scanning signals, a periodic fringe pattern, having a defined fringe pattern period and resulting from the illumination of the measuring graduation 10 in a scanning plane, is scanned by the fiber-optical scanning head 20. The illumination of the measuring graduation 10 takes place by supplying an appropriate bundle of illuminating beams via the fiber-optical waveguide 22. For this purpose, a spectrally broadband light source 23 containing radiation portions from a continuum of different wavelengths is arranged at the end of the fiber-optical waveguide 22 facing away from the measuring graduation, whose radiation can be coupled into the fiber-optical waveguide 22 in the form of a bundle of illuminating beams via optical couplings 24, 25, 26. In the present example, a collimator lens 24, a beam splitter 26, as well as a coupling lens 25, are represented in detail among the couplings 24, 25, 26.

For converting the bundles of partial signal beams into position-dependent scanning signals, a detector arrangement 30 is provided at the detection side at the end of the fiber-optical waveguide 22 facing away from the measuring graduation. The detected bundles of partial signal beams are fed to it via the fiber-optical waveguide 22; reference is made to the later description of FIG. 6 regarding the basic structure of the detector arrangement 30. Finally, from the detector arrangement 30 the position-dependent scanning signals are supplied to an electronic follow-up device, not represented, which employs these signals, for example for the purpose of regulating the location, or controlling the position, of the objects which can be moved with respect to each other.

Therefore the various active components of the position measuring arrangement in accordance with the present invention, such as the light source 23 and the detector arrangement 30 in particular, are arranged spatially distant from the actual measurement location and are only optically coupled with them via the fiber-optical waveguides 22. For one, this makes possible the minimization of interference effects in connection with these components, as well as an extremely compact design of the fiber-optical scanning head 20 at the measurement location.

The fiber-optical waveguide 22 is preferably designed to employ a multi-mode fiber, through which it is possible to transmit the bundles of illuminating light beams used for illumination toward the measuring graduation 10, as well as the bundles of partial signal beams used for detection away from the measuring graduation 10 in the direction of the detector unit 30.

Figure 1:
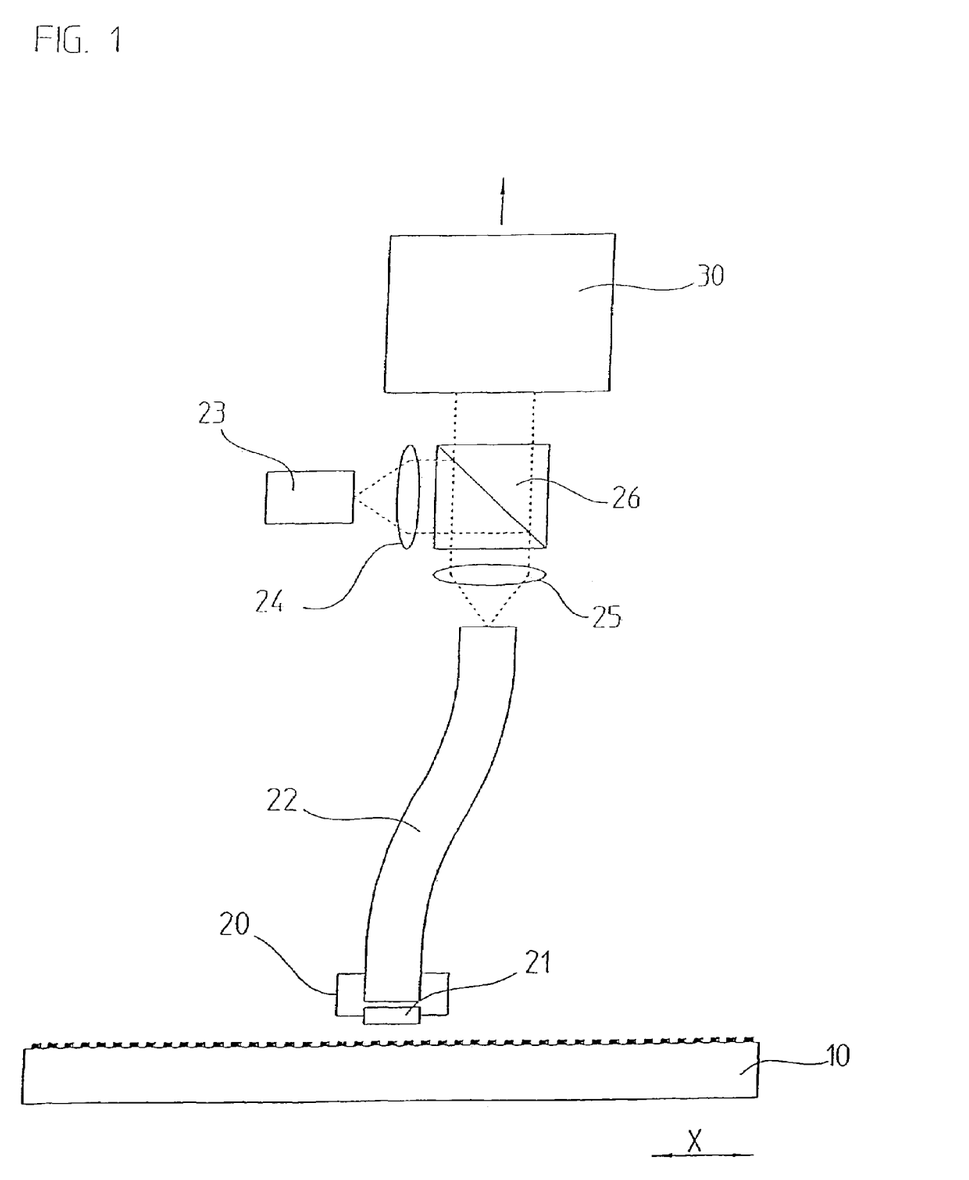
FIG. 1 is a greatly schematic representation of an embodiment of a position measuring arrangement in accordance with the present invention.

In particular, in order to assure the desired single field scanning characteristic of the optical position measuring arrangement, a definite design, only schematically indicated in FIG. 1, of the scanning plate 21 is provided in the fiber-optical scanning head 20. In particular, the scanning plate 21 is matched to that fringe pattern period that the periodic fringe pattern has which can be modulated as a function of the displacement and is the result of the interaction between the incident bundle of illuminating beams and the measuring graduation 10 in the scanning plane. It should be pointed out here that it is in no way essential for the present invention by what optical interaction mechanism between the bundle of illuminating beams and the measuring graduation and possible further optical elements in the beam path the periodic fringe pattern, which can be modulated as a function of displacement, is generated in the end. Thus, perhaps in case of a reflection amplitude grating used on the part of the measuring graduation 10, this can be the geometric periodic fringe pattern of the measuring graduation 10, but in case of the use of a reflection phase grating, a diffraction image of the measuring graduation 10.

In an advantageous embodiment it is possible to employ a scanning principle in connection with the optical position measuring arrangement in accordance with the invention, such as is known from the publication "Analysis of Grating Imaging and Its Application to Displacement Metrology" by R. M. Pettigrew, SPIE, vol. 136, 1st European Congress on Optics Applied to Metrology (1977). It is possible here to realize such a so-called (three grating) scanning principle in various grating configurations, which as a rule differ by the sequence of the scanning and measuring graduation gratings through which the beam bundles pass. Thus, a scanning beam path can be realized for example, in which a scanning grating, the measuring graduation grating and another scanning grating are sequentially being passed through, or charged. Alternatively, arrangements are also conceivable, in which the bundles of beams pass through, or charge, a measuring graduation grating, a first scanning grating and a second scanning grating, or a first scanning grating, a second scanning grating and the measuring graduation grating, one after the other.

Regarding alternative embodiment variations, it should furthermore be mentioned that, supplementing the example represented in FIG. 1, another lens can be arranged in front of the measurement end on the measuring graduation side of the fiber-optical waveguide. In a known manner it is then possible to set the size of the scanning field on the measuring graduation. Reference is made in this connection to, for example, EP 163 362 B1 and U.S. Pat. No. 4,776,701, the entire contents of which are incorporated herein by reference.

It should furthermore be mentioned that an optical deflection element, for example designed as a 90° deflection prism, can be arranged at the end of the fiber-optical waveguide on the measuring graduation side. By this it is then possible to provide an optical fiber input in the fiber-optical scanning head parallel with the measuring graduation, and the scanning head can be designed to be constructed in an extremely flat way.

It is assured by the design of different possible embodiments of the scanning plate 21 explained in detail in what follows, that by one or more bundles of illuminating beams it is possible to create fringe patterns within a fringe pattern period, which are phase-shifted in relation to each other, in bundles of partial signal beams by a wavelength-dependent local separation. The different bundles of partial signal beams can then be used by the downstream-located detector arrangement 30 for conversion into position-dependent phase-shifted scanning signals.

Three scanning signals, phase-shifted by 120°, are created in a known manner by the above mentioned (three grating) scanning principle. These are electrically wired in the customary manner to form two offset-free signals, phase-shifted by 90°, which can then be further processed in an electronic follow-up device.

However, in a known manner it is of course also possible to generate a different phase-shift between the scanning signals by modified scanning principles.

Based on the following description of FIGS. 2a, 2b, as well as 3a, 3b, it will now be explained how this is assured by a first exemplary embodiment of a suitable scanning plate.

Figure 2A:
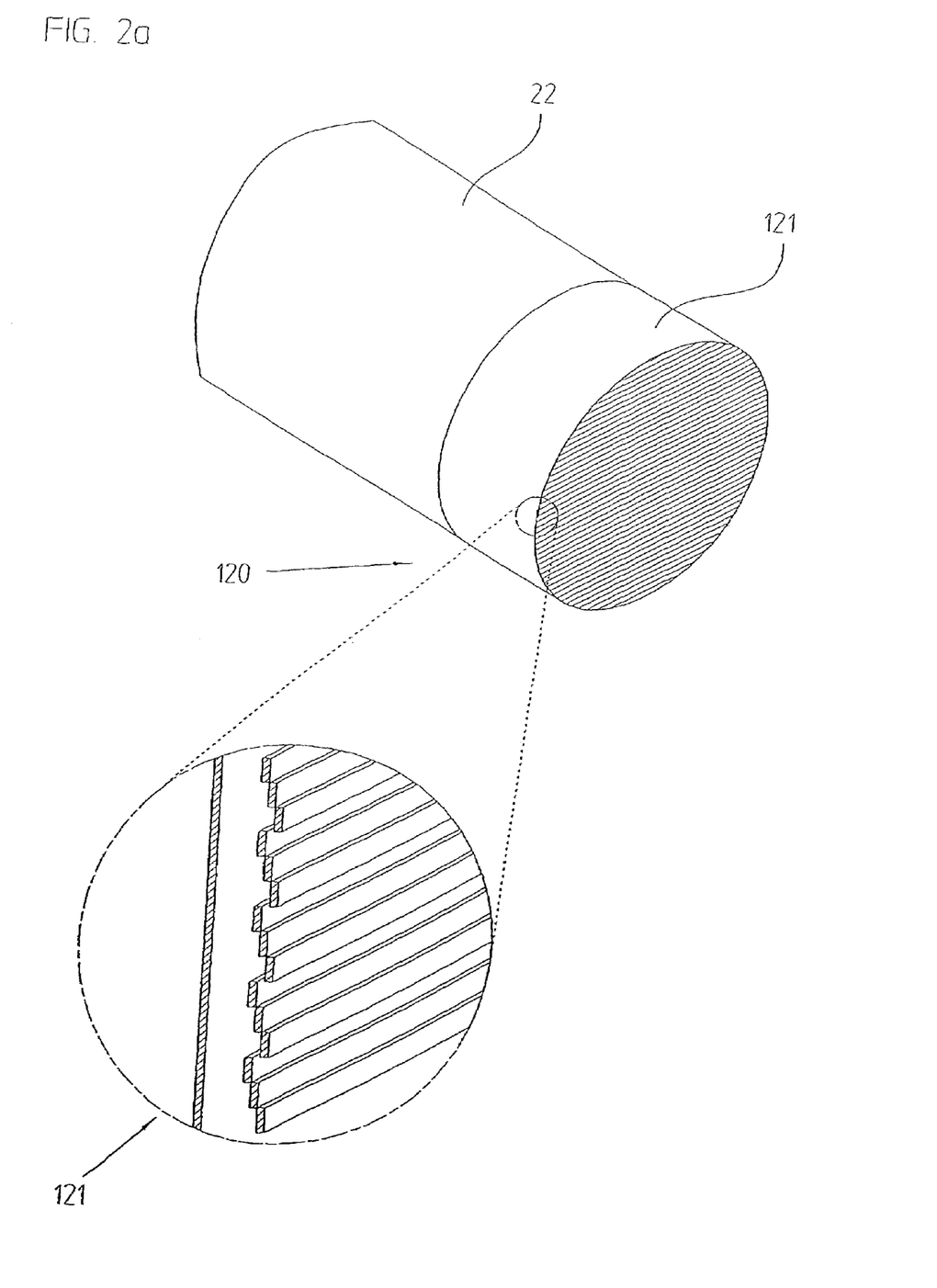
FIGS. 2a, 2b show different views of a first embodiment of a scanning plate for the fiber-optical scanning head of the position measuring arrangement of FIG. 1 in accordance with the present invention.
Figure 2B:
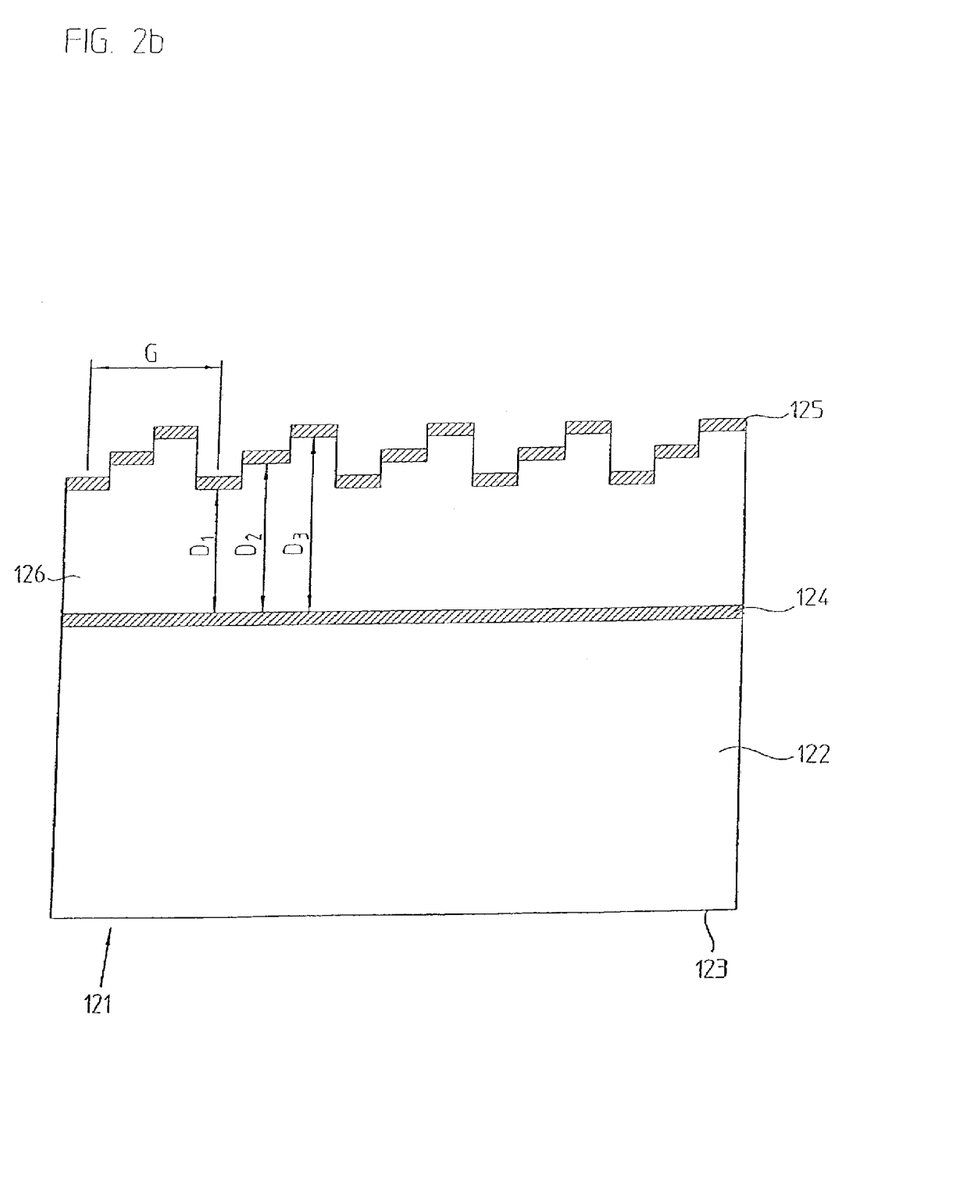

FIG. 2a is a perspective view of the fiber-optical scanning head 120, as well as a perspective partial representation of the scanning plate 121 used, a schematic sectional representation of the scanning plate 121 used in this exemplary embodiment is represented in FIG. 2b.

In this variation, the scanning plate 121 is designed as a stepped phase grating on a transparent support substrate 122, which is arranged directly in front of the end on the measuring graduation side of the fiber-optical waveguide 22. The phase grating has several steps within one grating period G. In this way, and together with a partially reflective intermediate layer, or reflecting layer 124, or alternatively with the substrate backside 123, several partial etalons per grating period G are formed, which are matched to the various wavelengths of the at least one illuminating beam bundle. In the example represented, three steps within one grating period G are provided, which then result in the formation of three partial etalons (or Fabry-Perot resonators) of the indicated etalon thicknesses $D_1$, $D_2$ and $D_3$.

To optimize the desired etalon properties, it is provided in this example to equip the support substrate 122, for example made of quartz, over its entire surface with a first planar reflecting layer 124, for example a partially reflecting metallic or dielectric reflecting layer, or with a corresponding layer package, and to arrange the stepped phase-grating structure 126 on it. In a preferred embodiment, the phase-grating structure 126 is made of $SiO_2$. Then, a second reflecting layer 125 is arranged on the phase-grating structure 125, for example again as a partially reflecting metallic or dielectric reflecting layer. The spectral full-width-at-half-maximums $\Delta\lambda_i$ of the transmission wavelengths $\lambda_i$ of the partial etalons (i=1, 2, 3) can be advantageously reduced by the reflecting layers 124, 125.

The spectral full-width-at-half-maximums $\Delta\lambda_i$ of the transmission wavelengths $\lambda_i$ of the partial etalons here result in accordance with the following Equation. (1):

$$\Delta\lambda_i = [(1-R)/\sqrt{R}] * [\lambda_i^2/(2\pi * n * D_i)] \quad \text{(Equ. 1)}$$

wherein
R=the reflectivity of the reflecting layers 124, 125
$\lambda_i$=transmission wavelengths of the partial etalons i (i=1, 2, 3)
n=diffraction index in the etalon
$D_i$=respective etalon thickness (i=1, 2, 3)

Regarding the dimensioning of the partial etalons, it has furthermore been shown to be advantageous if the respective spectral full-width-at-half-maximum $\Delta\lambda_i$ of the transmission wavelength $\lambda_i$ of the partial etalons is selected to be smaller than the spectral spacing $\Delta\lambda_E$ of the transmission lines, or of the transmission wavelengths $\lambda_i$ of the partial etalons. In this connection, specific mention should be made of FIG. 3a, which shows the emission line of the light source used, the transmission characteristic of the various partial etalons, as well as the various values mentioned.

Figure 3A:
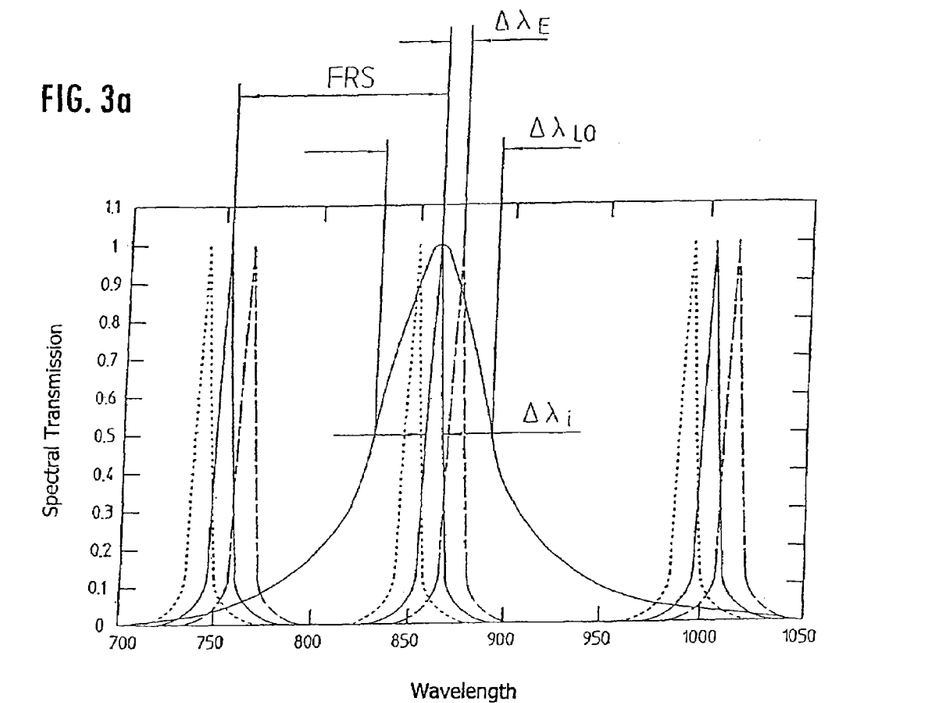
FIGS. 3a, 3b contain different diagrams to explain the functional principle of the scanning plate in FIGS. 2a and 2b.

It is furthermore necessary to assure that the spectral spacing $\Delta\lambda_E$ between individual transmission lines, or transmission wavelengths $\lambda_i$, of the partial etalons is located symmetrically within the spectral full-width-at-half-maximum $\Delta\lambda_{LQ}$ of the light source emission characteristic, so that the resultant signal amplitudes for the various wavelengths are not too different.

Moreover, the spectral spacing $\Delta\lambda_E$ between individual transmission lines, or transmission wavelengths $\lambda_i$, of the partial etalons should be small with respect to the free spectral range FSR between the transmission wavelengths $\lambda_i$ of the partial etalons; the free spectral range FSR results here in accordance with the following Equation (2):

$$FSR=\lambda_i^2/(2*n*D_i)]$$ (Equ. 2)

wherein
FSR=free spectral range between the transmission wavelengths $\lambda_i$ of the partial etalons
$\lambda_i$=transmission wavelengths of the partial etalon (i=1, 2, 3)
n=diffraction index in the etalon
$D_i$=respective etalon thickness (i=1, 2, 3)

Because of the large numerical aperture of multi-mode optical fibers (typically 0.2), and of the large divergence in radiation characteristics at the end on the measuring graduation side of the fiber-optical waveguide 22 resulting therefrom, the axial mode number of the partial etalons (and therefore the etalon thickness $D_i$) should be selected to be small in order to minimize possible crosstalk from a resonant etalon mode to the neighboring partial etalons. Otherwise, such crosstalk would cause an undesired signal loss.

Moreover, the etalon thicknesses $D_i$ are preferably selected to be small with respect to the coherence length $L_{coh}$ of the light source used. Furthermore, a sufficient wavelength selectivity in connection with the required small axial mode number is set by the selection of the reflectivity R or the dielectric or metallic reflecting layers 124, 125.

In the exemplary embodiment represented in FIG. 3a, n=1.5, the effective wavelength $\lambda$ of the broadband light source is selected in accordance with $\lambda$=860 nm, its spectral half-value width $\Delta\lambda_{LQ}$=50 nm, i.e. the coherence length $L_{coh}$ of the light source results in $L_{coh}\approx 15$ µm. The spectral half-value width $\Delta\lambda_E$ between the transmission wavelengths $\lambda_i$ of the partial etalons results as $\Delta\lambda_E$=15 nm; the individual transmission wavelengths are $\lambda_1$=845 nm, $\lambda_2$=860 nm, $\lambda_3$=875 nm. In accordance with the further requirement that, for a satisfactory separation of the transmission wavelengths $\lambda_i$ of the partial etalons from the neighboring axial modes, and for achieving a small etalon thickness $D_i$, the free spectral range FSR should for example be four times as large as the maximum spectral spacing between the three partial etalons of 30 nm, at an axial mode number of 7, the following results in regard to the thicknesses of the individual partial etalons: $D_1$=1972 nm, $D_2$=2007 nm, $D_3$=2042 nm. Together with the requirement that, for an overlap-free separation of the individual transmission wavelengths $\lambda_i$, or of the transmission lines of the partial etalons, the spectral full-width-at-half-maximum $\Delta\lambda_i$ of the transmission lines should for example be one-third as large as their spectral spacing $\Delta\lambda_E$, a required reflectivity R for the two partially-reflecting layers 124, 125 results as R=0.87. On the other hand, the spectral full-width-at-half-maximum $\Delta\lambda_i$ of the transmission lines of the partial etalons should not be selected to be too small, since in this case only a small signal amplitude results.

Figure 3B:
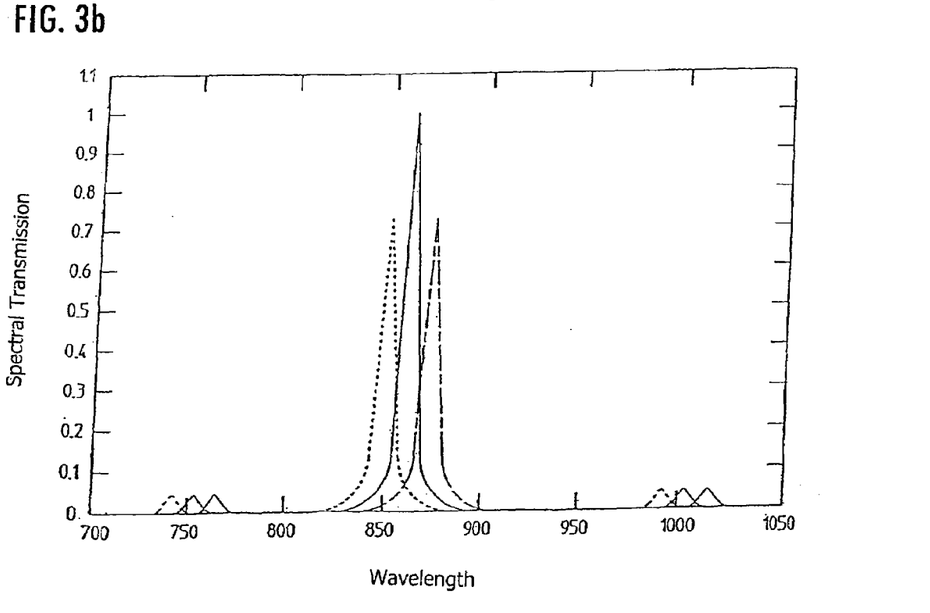

The spectrum of the light source, filtered by the partial etalons, is represented in FIG. 3b, whose emission line has a spectral full-width-at-half-maximum $\Delta\lambda_{LQ}$, such as represented in FIG. 3a. This spectrum is correlated with the signal value of the phase-shifted individual signals.

To produce such scanning plates, a reflecting layer 124 in the form of a dielectric mirror layer of a reflectivity R=0.87 is applied by vacuum metallization to the support substrate 122. Subsequently, the application by vacuum metallization of the stepped structure of different partial etalon thicknesses made of a highly transparent dielectric material, for example $SiO_2$, takes place in three steps. Alternatively to this it is also possible to apply a thick $SiO_2$ layer by vacuum metallization, whose thickness is then reduced in two steps to the desired local etalon thickness by structurized etching. Finally, the second reflecting layer 125 in the form of a dielectric mirror layer is applied by vacuum metallization.

Alternatively to the application of the $SiO_2$ layers by structured vacuum metallization (or the application by vacuum metallization and local structured etching), the required thickness of the different partial etalons can also be assured by a stamping process using a colloidal, gel or plastic layer. Because of the possible production of a large plate containing identical scanning plates of this type, and subsequent drilling-out of smaller disks of the diameter of the optical fiber, it is possible to obtain a large multiple use, and therefore only low unit costs, of the scanning plates in accordance with the invention.

Quartz glass, or a suitable plastic material, is preferably selected as the material for the scanning plate 121, whose diffraction index is as identical as possible to the diffraction index of the fiber core material of the fiber-optical waveguide 22. It is possible in this way to avoid unnecessary reflection losses in this area. The adhesive connection of the scanning plate 121 and the fiber-optical waveguide is preferably provided in such a way that an optimal "index matching" results at this connecting point.

Figure 4A:
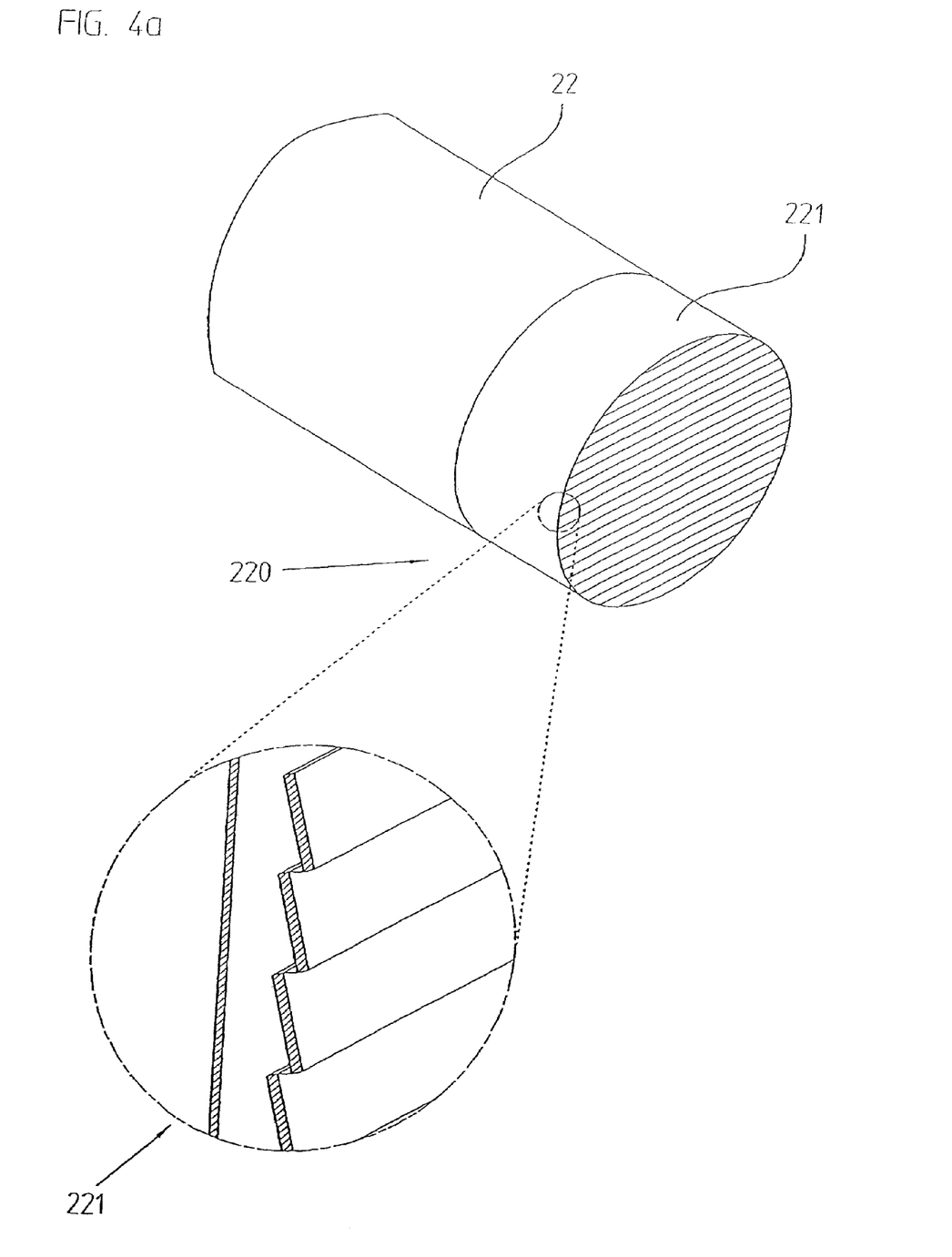
FIGS. 4a, 4b show different views of a second embodiment of a scanning plate for the fiber-optical scanning head of the position measuring arrangement of FIG. 1 in accordance with the present invention.

By FIGS. 4a and 4b it will be explained in what follows how desired single field scanning can be assured in a second embodiment of a suitable scanning plate in the fiber-optical scanning head of the position measuring arrangement of the invention.

Figure 4B:
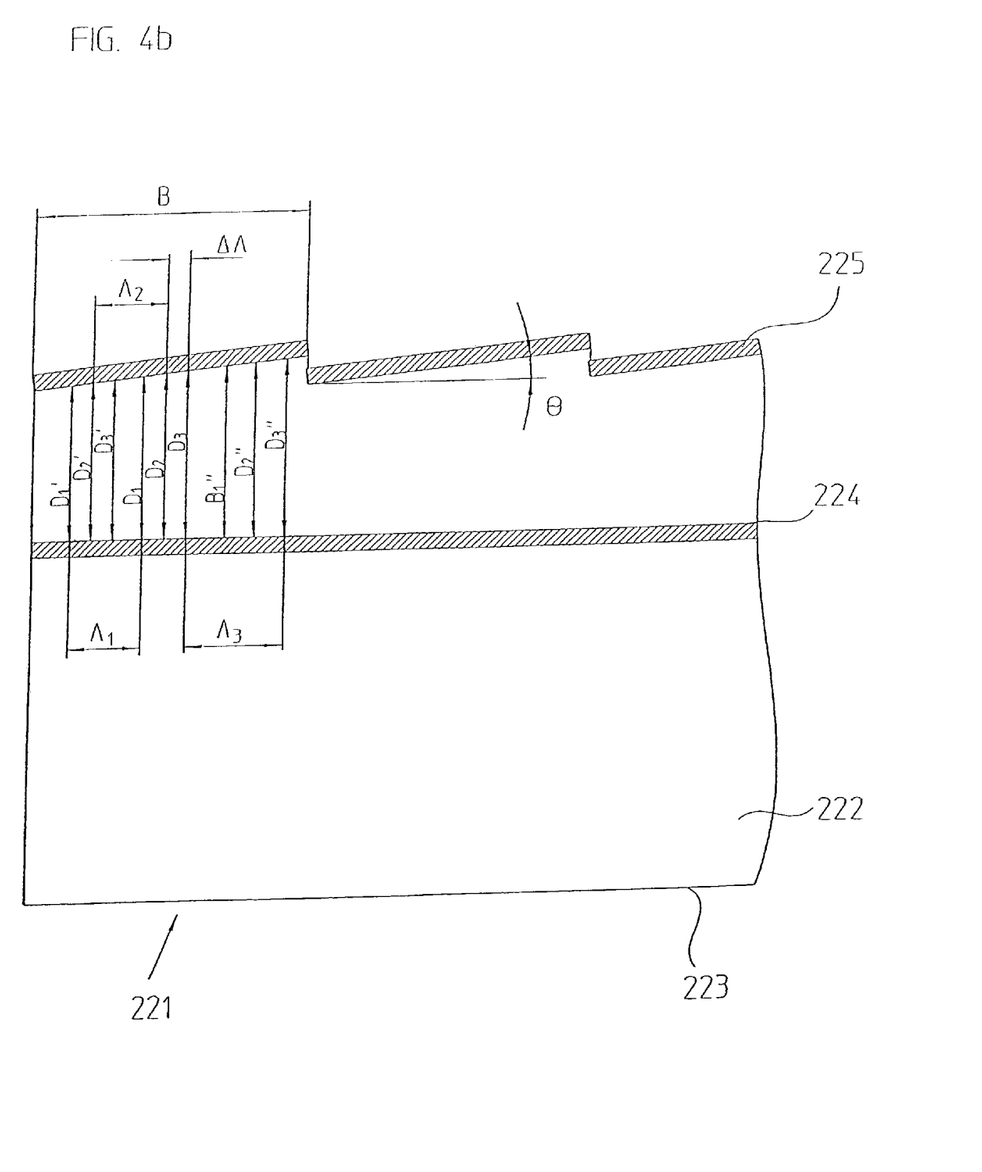

FIG. 4a again shows a perspective plan view of the fiber-optical scanning head 220, as well as a perspective representation of a portion of the scanning plate 221 employed, a schematic sectional representation of the scanning plate 221 employed in this exemplary embodiment is represented in FIG. 4b.

In this embodiment, the scanning plate 221 is embodied in the form of a wedge-shaped (Fizeau) plate, segmented over portions and having a sawtooth-shaped surface structure on a transparent support substrate 222, which is again arranged directly in front of the end on the measuring graduation side of the fiber-optical waveguide 22 in the fiber-optical scanning head 220. A Fizeau interference fringe pattern of uniform thickness is generated with the aid of such a scanning plate 221, wherein the wedge angle $\theta$ of the plate is selected in the present example in such a way that the resulting fringe spacing $\Lambda$ in the Fizeau interference fringe pattern corresponds to the fringe pattern period generated by the measuring graduation. It is possible to generate several Fizeau interference fringe patterns of uniform thickness within a fringe pattern period over the sectionally segmented wedge-shaped plate with the sawtooth-shaped surface structure.

The fringe spacing $\Lambda$ of the Fizeau interference fringe pattern here is the result of the following Equation (3):

$$\Lambda=\lambda/(2*n*\theta)$$ (Equ. 3)

wherein
$\lambda$=wavelength of the light source
n=refraction index of the wedge-shaped plate
$\theta$=wedge angle of the wedge-shaped plate Here, the wedge angle $\theta$ is laid out in such a way that a fringe spacing $\Lambda$ results which, as mentioned in connection with the above example, corresponds to the graduation period of the measuring graduation when the diffraction pattern is scanned. In the case of scanning the geometric pattern, the wedge angle θ is laid out in such a way that the fringe spacing corresponds to double the graduation period of the measuring graduation.

Because different fringe spacings $\Lambda_i$ in the Fizeau interference fringe pattern also result for the different wavelengths $\lambda_1, \lambda_2, \lambda_3$ in the bundle of illuminating beams in accordance with Equ. 3, the phase position of the three chromatic strips relative to the phase position of the measuring graduation diverges after a number of fringe spacings, which has an undesired reduction of the signal amplitudes as a result. This undesired effect can be reduced in that the scanning plate 221 is segmented over portions, so that a sawtooth-shaped structure results, as can be seen in FIG. 4b.

Such an embodiment of a scanning plate 221 can also be produced by the colloidal, gel or plastic stamping process already mentioned above. Following the stamping process, the reflection layer 225 is then applied to the top of the scanning plate 221.

In order to limit the signal loss maximally to 10%, the difference, added up over several fringes, between the fringe spacings $\Lambda_1, \Lambda_2$ generated by the wavelengths $\lambda_1, \lambda_2, \lambda_3$ in the bundle of illuminating beams and the fringe spacing $\Lambda_2$ generated by the wavelength $\lambda_2$ is allowed to be maximally a quarter of the graduation period of the measuring graduation. Since the fringe pattern generated by the wavelength $\lambda_1$ should have a constant phase shift of, for example, $\Phi_{12}=-120°$ in comparison with the fringe pattern generated by the wavelength $\lambda_2$, and the fringe pattern generated by the wavelength $\lambda_3$ should have a constant phase shift of, for example, $\Phi_{23}=+120°$ in comparison with the fringe pattern generated by the wavelength $\lambda_3$, the wavelengths $\lambda_1$ and $\lambda_3$ are fixedly linked with the wavelength $\lambda_2$. For a desired phase shift of +/−120°, the wavelengths $\lambda_1$ and $\lambda_3$ adjoining the central wavelength $\lambda_2$ are a function of the respective axial mode number N in accordance with the following equations (Equ. 4.1) and (Equ. 4.2):

$$\lambda_1 = \lambda_2 * [1 + \Phi_{12}/(2*\pi*N)] = \lambda_2 * [1 - 1/(3*N)] \quad \text{(Equ. 4.1)}$$

$$\lambda_3 = \lambda_2 * [1 + \Phi_{23}/(2*\pi*N)] = \lambda_2 * [1 + 1/(3*N)] \quad \text{(Equ. 4.2)}$$

wherein:
$\lambda_i$=wavelength in the bundle of illuminating light beams
$\Phi_{12}$=phase shift between the Fizeau fringe patterns generated by the wavelengths $\lambda_1$ and $\lambda_2$
$\Phi_{23}$=phase shift between the Fizeau fringe patterns generated by the wavelengths $\lambda_2$ and $\lambda_3$
N=number of modes According to Equ. 5, the difference $\Delta\lambda$ of the wavelengths adjoining $\lambda_2$ in the bundle of illuminating light beams for the chromatic coding of the phase-shifted individual signal results as:

$$\Delta\lambda = (\Phi * \lambda_2)/(2*\pi*N) = \lambda_2/(3*N) \quad \text{(Equ. 5)}$$

wherein:
$\Delta\lambda$=wavelength difference between the central wavelength $\lambda_2$ and the neighboring wavelengths $\lambda_1$ and $\lambda_3$
$\Phi$=phase shift between the Fizeau fringe patterns of neighboring wavelengths
$\lambda_2$=central wavelength in the bundle of illuminating light beams
N=number of modes In the case of scanning the diffraction pattern with a graduation period of the measuring graduation of 20 μm, the required strip spacing in the Fizeau interference fringe pattern is also 20 μm. At a mean wavelength $\lambda_2=860$ nm and a refraction index n=1.5, a required wedge angle $\Phi=14.3$ mrad results for the scanning plate 221 in accordance with the second exemplary embodiment.

The same considerations already discussed in connection with the first exemplary embodiment apply to the mean thickness $D_2$, i.e. the mean number of modes is therefore also 7. The number of modes respectively changes by 1 for the adjoining thicknesses $D_2'$, $D_2''$, etc. Therefore, at an axial number of modes of 7, the mean thickness $D_2$ is, as in the above example, $D_2=2007$ nm, and is again small with respect to the coherence length $L_{coh}$ of the light source employed.

The difference $\Delta\lambda$ of the two neighboring wavelengths $\lambda_1$ and $\lambda_3$ in relation to $\lambda_2$ for chromatic coding for a phase shift by +/−120° of the fringe patterns, and therefore of the individual signals, results in $\Delta\lambda=41$ nm. For covering all individual signals, the spectral distribution of the light source employed would have to be clearly broader than 82 nm. However, it is customarily not possible to assure this with a reasonable outlay by a single light source. For this reason, a synthetic light source can be preferably employed in this embodiment, in which the light from three LEDs or laser diodes of individual wavelengths $\lambda_1=819$ nm, $\lambda_2=860$ nm and $\lambda_3=901$ nm is superimposed.

Alternatively to this it is also possible to employ a white LED, whose light is filtered through optical interference or bandpass filters.

The difference $\Delta\Lambda$ in the fringe period of neighboring fringe patterns of different wavelengths therefore results as $\Delta\Lambda=953$ nm. If, in accordance with the above condition, the difference between the fringe periods of different wavelength, added together over several fringes, is not to exceed a quarter of the graduation period of the measuring graduation, the following Equation 6 should be met in accordance with the maximum fringe number m:

$$m*953 \text{ nm} \leq 5 \text{ μm} \quad \text{(Equ. 6)}$$

The result of this is m≤5. Therefore the periodicity of the wedge-shaped scanning plate 221 of sawtooth-shaped segments is selected to equal 100 μm. Only three fringes are represented in FIG. 4b for reasons of improved clarity.

In contrast to the first example, different conditions now apply in regard to the different reflection layers 224, 225. In order not to unnecessarily reduce the signal amplitude, the half-value widths $\Delta\lambda_i$ of the individual transmission lines should not be much narrower than the spectral full-width-at-half-maximums $\Delta\lambda_{LQi}$ of the individual light sources preferably employed in this example. At a spectral full-width-at-half-maximum $\Delta\lambda_{LQ}=50$ nm, a required reflectivity of R=30% results for the two reflection layers 224, 225 of the scanning plate 221.

Figure 5:
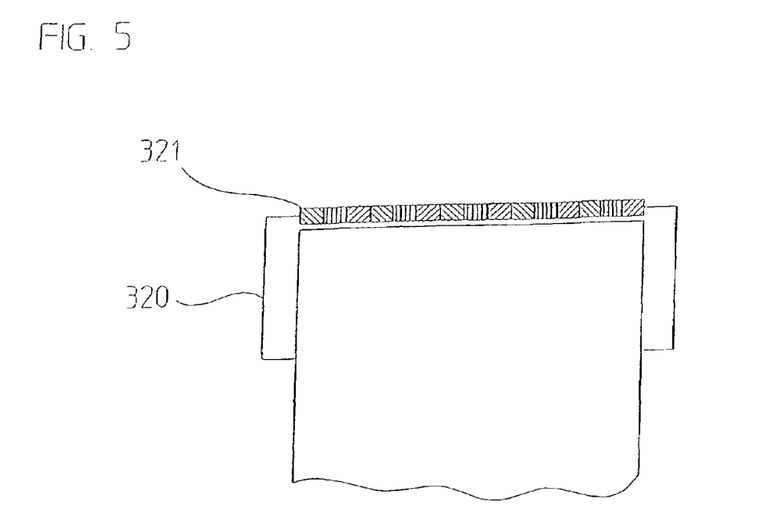
FIG. 5 shows a third embodiment of a scanning plate for the fiber-optical scanning head of the position measuring arrangement of FIG. 1 in accordance with the present invention.

A third embodiment of a suitable scanning plate 321 for the fiber-optical scanning head of the position measuring arrangement in accordance with the present invention is shown in a schematic representation in FIG. 5.

It has now been provided here to embody the scanning plate 321 in the form of several strip-shaped partial areas having different spectral transmission characteristics, which are matched to wavelengths $\lambda_i$ in at least one bundle of illuminating light beams. It is possible here to embody the different partial areas in the form of plastic layers which can be photo-structured, for example, and which respectively provide maximum transmission at the three desired wavelengths $\lambda_i$. The appropriate plastic materials are structured in the form of strips, wherein the strip width is approximately a third of the periodicity of the scanning plate.

Figure 6:
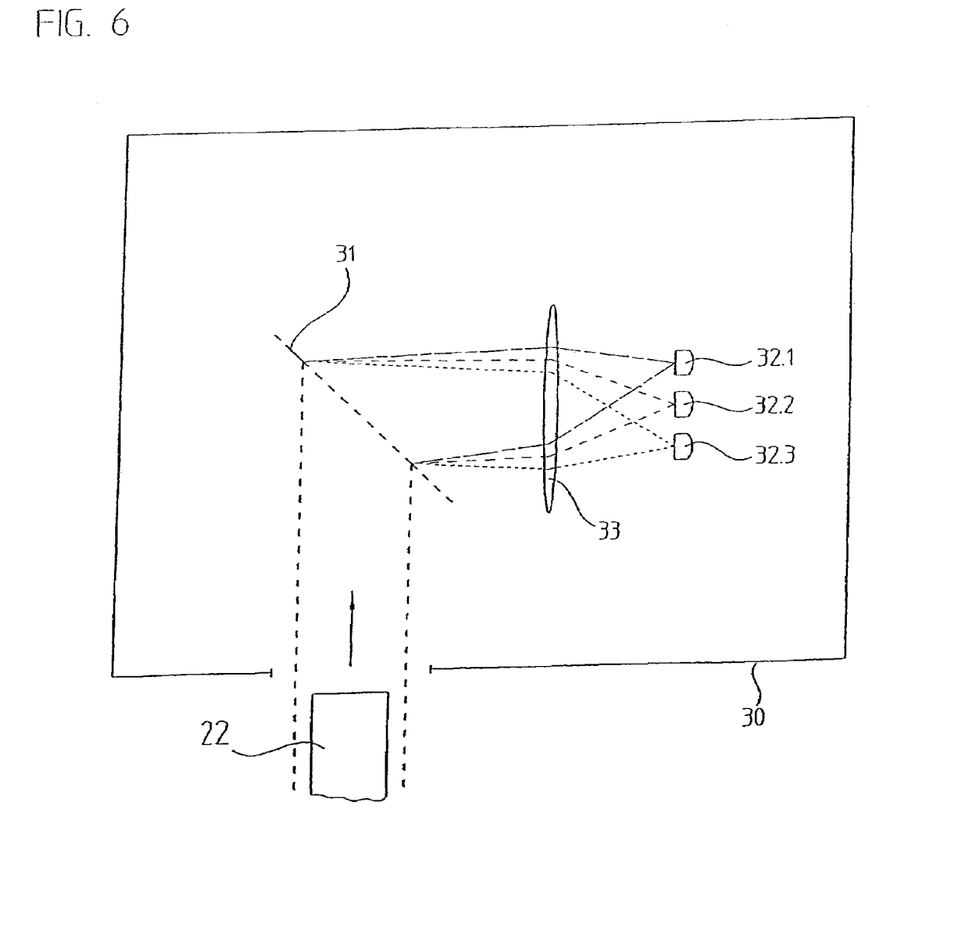
FIG. 6 is a greatly schematic representation of an embodiment of a suitable detector arrangement for the position measuring arrangement of FIG. 1 in accordance with the present invention.

A detector arrangement 30, such as can be employed in the position measuring arrangement in accordance with the invention, is represented in schematic form in FIG. 6. As already indicated above, the detector arrangement 30 is basically used for the spectral separation of the phase-shifted individual signals coded by different wavelengths. For this purpose the detector arrangement, which is arranged at the end of the fiber-optical waveguide facing away from the measuring graduation, includes schematically indicated splitter 31 for the wavelength-dependent separation of the bundles of partial signal light beams being transmitted in the direction of the detector arrangement 30 by the fiber-optical waveguide. In the present example, the splitter 31 is embodied as a dispersive element in the form of a diffraction grating, which splits the incident bundle of light beams containing the three colinear bundles of partial signal light beams into three individual signal light beams, which are further propagated in the direction of a lens 33 at three easily distinguishable angles. Finally, the individual signal light beams are focused by the lens 33 on three downstream-located detector elements 32.1 to 32.3, which convert the detected individual signal light beams into electrical phase-shifted scanning signals.

If, for example as described in the first exemplary embodiment by a suitable scanning plate, a wavelength difference of 15 nm exists between the individual wavelengths $\lambda_i$, and the splitting means 31, or diffraction grating, has a grating constant of 0.6 µm, at an angle of incidence of 45°, at which the incident bundle of signal beams impinges on the diffraction grating, a diffraction angle of approximately 45° results also results for the exiting bundles of individual signal beams. The grating constant of the diffraction grating has here been selected to be so small that, at the wavelength of 860 nm only a zero and a first order of diffraction can occur. If the diffraction grating is here laid out as a phase grating, it is also possible to suppress the zeroth order of diffraction by the suitable selection of the grating parameters of line width and step height. This has been shown to be advantageous for the resulting signal amplitude.

In the case of the above mentioned individual wavelengths, an angular splitting of 36 mrad results at a grating constant of 0.6 µm. With a lens 33 of a focal length of 60 mm, a lateral splitting of 2.2 mm results in the detector plane.

Analogously to these exemplary considerations it is also possible to suitably dimension the detector arrangement in connection with another existing difference of the individual wavelengths.

Alternatively to the represented example, the chromatic decoding of the bundle of signal beams entering the detector arrangement 30 into the three bundles of individual signal light beams can also take place with other splitters. For example, a dispersion prism, dichroic mirrors, as well as combined arrangements of beam splitters and interference filters, are also suitable.

Not represented in FIG. 6 are further components for signal processing, which can be additionally arranged therein. Part of these are, for example, amplification modules, A/D converters, etc., by which further electronic processing and preparation of the scanning signal is performed.

Besides the explained embodiments, it is of course possible to further modify the considerations in accordance with the invention.

Figure 7:
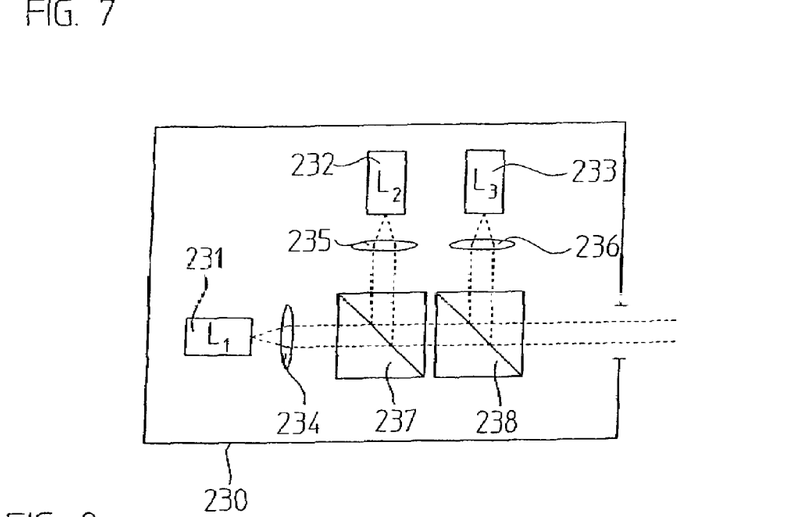
FIG. 7 is a greatly schematic representation of an embodiment of an alternative light source arrangement for the position measuring arrangement of FIG. 1 in accordance with the present invention.

As had been mentioned in connection with the description of the second exemplary embodiment of a suitable scanning plate, it could possibly be necessary to employ, instead of a single broadband light source, a combined light source, or light source unit, consisting of the individual light sources of different individual wavelengths. Depending on the embodiment, laser diodes, VCSELs (vertical cavity surface-emitting lasers), LEDs, OLEDs (organic LEDs), etc. can be employed as light source. An appropriate light source unit 23 is schematically represented in FIG. 7. Here, three individual light sources 231, 232, 233, each with upstream-located optical elements 234, 235, 236, are provided, so that collimated bundles of beams can be superimposed to form a single bundle of output or illuminating beams via two beam splitters 237, 238.

Figure 8:
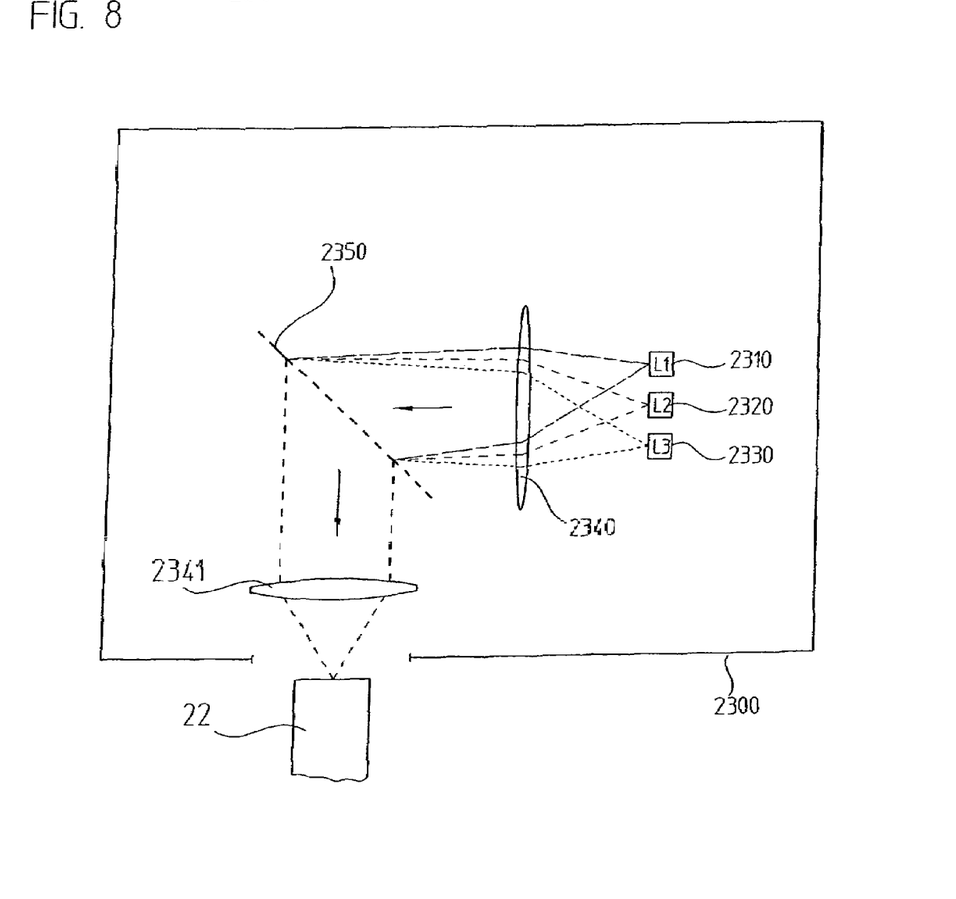
FIG. 8 is a greatly schematic representation of an alternative embodiment of a light source arrangement for the position measuring arrangement of FIG. 1 in accordance with the present invention.

A further alternative embodiment variation of a light source unit 2300 is schematically represented in FIG. 8. It is provided in this example to couple-in the radiation from three individual light sources 2310, 2320, 2330 via a first lens 2340, a diffraction grating 2350 and a second lens 2341 into the fiber-optical waveguide 22. It is possible here to also employ dichroic beam splitters as an alternative to diffraction gratings 2350.

It should be pointed out that of course various arrangement options for the light source(s) and the detector elements exist in accordance with the above explained variations. In this connection, for example, a detector arrangement, such as represented in FIG. 6, should be mentioned, in which the radiation from a light source in transmission is coupled into fiber-optical waveguide 22 via the diffraction grating 31.

The foregoing description is provided to illustrate the invention, and is not to be construed as a limitation. Numerous additions, substitutions and other changes can be made to the invention without departing from its scope as set forth in the appended claims.

We claim:

1. An optical position measuring arrangement for determining the relative position of a fiber-optical scanning head and of a measuring graduation, which can be moved with respect to said fiber-optical scanning head in at least one measuring direction, the optical position measuring arrangement comprising:
    a source of illumination that generates one or several bundles of illuminating beams;
    a measuring graduation that is illuminated by said source of illumination so as to generate a periodic fringe pattern of a defined fringe pattern period;
    a fiber-optical scanning head, wherein said measuring graduation moves relative to said fiber-optical scanning head and wherein said fiber-optical scanning head scans said periodic fringe pattern;
    a scanning plate is arranged in said fiber-optical scanning head in front of an end of a fiber-optical waveguide positioned at a side of said measuring graduation, wherein said scanning plate is matched to said fringe pattern period and scans said periodic fringe pattern when said fiber-optical scanning head scans said periodic fringe pattern; and
    wherein fringe patterns, which are phase-shifted in relation to each other, are generated within a fringe pattern period in bundles of partial signal beams in said one or several bundles of illuminating beams via a wavelength-dependent local separation, and said bundles of partial signal beams are employed for conversion into position-dependent phase-shifted scanning signals.

2. The optical position measuring arrangement in accordance with claim 1, wherein said fiber-optical waveguide comprises a multi-mode fiber, over which said one or several bundles of illuminating beams used for illumination are transmitted toward said measuring representation, as well as said bundles of partial signal beams are transmitted away from said measuring representation.

3. The optical position measuring arrangement in accordance with claim 2, wherein said source of illumination comprises a spectrally broad-band light source arranged at a second end of said fiber-optical waveguide facing away from said measuring graduation, whose radiation in the form of said one or several bundles of illuminating beams are respectively coupled into the fiber-optical waveguide via a coupling.

4. The optical position measuring arrangement in accordance with claim 3, further comprising a detector arrangement is arranged at said second end of said fiber-optical waveguide facing away from said measuring graduation, said detector arrangement comprising:

a splitter for wavelength-dependent separation of said bundles of partial signal beams; and several optoelectronic detector elements, to which said separated bundles of partial signal beams are received and which convert said received separated bundles of partial signal beams into electrical phase-shifted scanning signals.

5. The optical position measuring arrangement in accordance with claim 2, wherein said source of illumination comprises several light sources, which emit radiation in different wavelengths and are arranged at a second end of said fiber-optical waveguide facing away from said measuring graduation, whose radiation in the form of said one or several bundles of illuminating beams are respectively coupled into the fiber-optical waveguide via a coupling.

6. The optical position measuring arrangement in accordance with claim 5, further comprising a detector arrangement is arranged at said second end of said fiber-optical waveguide facing away from said measuring graduation, said detector arrangement comprising:

a splitter for wavelength-dependent separation of said bundles of partial signal beams; and several optoelectronic detector elements, to which said separated bundles of partial signal beams are received and which convert said received separated bundles of partial signal beams into electrical phase-shifted scanning signals.

7. The optical position measuring arrangement in accordance with claim 1, wherein said scanning plate is designed as a stepped phase grating on a transparent support substrate, which has several steps within a grating period, so that in this way, together with either a backside of said substrate or a reflecting layer, several partial etalons having different transmission wavelengths are formed per grating period, which are matched to different wavelengths of said one or several bundles of illuminating beams.

8. The optical position measuring arrangement in accordance with claim 7, wherein spectral full-width-at-half-maximums and spectral spacings of transmission lines of said several partial etalons are selected to be less than a spectral full-width-at-half-maximum of an emission line of said source of illumination.

9. The optical position measuring arrangement in accordance with claim 8, wherein said spectral full-width-at-half-maximum of said transmission lines of said several partial etalons is respectively less than said spectral spacings of said transmission lines.

10. The optical position measuring arrangement in accordance with claim 8, wherein said transmission lines of said partial etalons are located symmetrically within said spectral full-width-at-half-maximum of said emission line of said source of illumination.

11. The optical position measuring arrangement in accordance with claim 8, wherein a free spectral range between said transmission lines of said several partial etalons is selected to be greater than said spectral full-width-at-half-maximum of said emission line of said source of illumination.

12. The optical position measuring arrangement in accordance with claim 7, wherein thicknesses of said several partial etalons are selected to be less than a coherence length of said source of illumination.

13. The optical position measuring arrangement in accordance with claim 7, wherein said scanning plate comprises:

a transparent support substrate defining a surface;

a first reflecting layer applied to all of said surface, and a second reflecting layer, wherein said stepped phase grating is made of a highly transparent dielectric device and is arranged on said first planar reflecting layer, and wherein said second reflecting layer is applied to said stepped phase grating.

14. The optical position measuring arrangement in accordance with claim 7, further comprising a detector arrangement arranged at said second end of said fiber-optical waveguide facing away from said measuring graduation, said detector arrangement comprising:

a splitter for wavelength-dependent separation of said bundles of partial signal beams, said splitter is a dispersive optical element;

a lens for focusing said separated bundles of partial signal beams so that they are received by several optoelectronic detector elements that are arranged in a focal plane of said lens, said several optoelectronic detector elements convert said received separated bundles of partial signal beams into electrical phase-shifted scanning signals, wherein widths of said several optoelectronic detector elements are matched to spectral widths of said several partial etalons.

15. The optical position measuring arrangement in accordance with claim 1, wherein said scanning plate comprises a wedge-shaped plate, segmented in sections, with a sawtooth-shaped surface structure on a transparent support structure, which generates a Fizeau interference fringe pattern of equal thickness, wherein a wedge angle of said plate is selected to be such, that a resultant fringe distance of said Fizeau interference fringe pattern corresponds to a fringe distance generated by said measuring graduation.

16. The optical position measuring arrangement in accordance with claim 15, wherein within one fringe pattern period generated by said measuring graduation several wavelength-coded Fizeau interference fringe patterns of the same thickness are generated in said wedge-shaped plate with a sawtooth-shaped surface structure.

17. The optical position measuring arrangement in accordance with claim 15, wherein mean thicknesses of said sections are selected to be smaller than a respective coherence length of said source of illumination.

18. The optical position measuring arrangement in accordance with claim 15, wherein a difference between said Fizeau interference fringe patterns of different wavelength, added up over said interference fringes within a sawtooth-shaped section, is maximally one quarter of said fringe pattern period generated by said measuring graduation.

19. The optical position measuring arrangement in accordance with claim 15, wherein said scanning plate comprises:

a first planar reflecting layer that is applied on all of a surface of said transparent support structure, wherein said wedge-shaped plate is arranged on said first planar reflecting layer and is made of a highly transparent dielectric device; and a second planar reflecting layer applied to said wedge-shaped plate.

20. The optical position measuring arrangement in accordance with claim 1, wherein said scanning plate comprises several strip-shaped partial areas with different spectral transmission characteristics, which are matched to a wavelength of said one or several bundles of illuminating beams.

21. The optical position measuring arrangement in accordance with claim 20, wherein said strip-shaped partial areas are embodied as transparent colored plastic layers.

* * * * *

UNITED STATES PATENT AND TRADEMARK OFFICE
CERTIFICATE OF CORRECTION

PATENT NO. : 7,701,593 B2 Page 1 of 1
APPLICATION NO. : 12/151587
DATED : April 20, 2010
INVENTOR(S) : Wolfgang Holzapfel et al.

It is certified that error appears in the above-identified patent and that said Letters Patent is hereby corrected as shown below:

In the Claims

In column 15, claim 12, line 59, after "with" replace "claim 7," with --claim 8,--.

Signed and Sealed this

Eighth Day of June, 2010

David J. Kappos
*Director of the United States Patent and Trademark Office*